United States Patent
White

(10) Patent No.: US 7,310,482 B1
(45) Date of Patent: Dec. 18, 2007

(54) OPTICAL WAVELENGTH CONVERSION FOR PHASE-MODULATED OPTICAL SIGNALS

(75) Inventor: Ian M. White, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 198 days.

(21) Appl. No.: 11/039,660

(22) Filed: Jan. 19, 2005

(51) Int. Cl.
 *H04B 10/00* (2006.01)

(52) U.S. Cl. ...................... 398/176; 398/175

(58) Field of Classification Search ........ 398/172–181, 398/79, 182
 See application file for complete search history.

(56) References Cited

U.S. PATENT DOCUMENTS

| 6,563,627 | B2* | 5/2003 | Yoo ........................... 359/326 |
| 6,646,784 | B2* | 11/2003 | Leuthold .................... 359/332 |
| 2001/0007509 | A1* | 7/2001 | Aso et al. ................... 359/326 |

OTHER PUBLICATIONS

Dong, Yi, "Cascade of all optical wavelength conversion for RZ-DPSK format using four wave mixing in SOA," 2004 Optical Society of America.

Product Data Sheet, "Agility 3105/3106 CW Widely Tunable Laser Assembly," Mar. 11, 2003, Agility Communications, Inc.
Product Specification Sheet "Pss 2060SPR Isue 1.0" Nov. 25, 2003, ITF Optical Technologies, The All Fiber Company, pp. 1-5.
Leuthoid, J., "All-Optical Wavelength Conversion and Regeneration," 2003 Optical Society of America, OCIS codes (190,5970) Semiconductor nonlinear optics; (250,5980) Semiconductor optical amplifiers.
Gnauck, A. H., "Demonstration of 42.7-Gb/s DPSK Receiver With 45 Photons/Bit Sensitivity" IEEE Photonics Technology Letters, vol. 15, No. 1, Jan. 2003, pp. 99-101.
Kazofsky, Leonid, "Advanced Optical Fiber Communications," Winter, 2000, Stanford Bookstore, EE 348.
"Device Characteristics of an Alcatel All-Optical-Wavelength-Converter," Alcatel, 2000.

* cited by examiner

*Primary Examiner*—Agustin Bello

(57) ABSTRACT

An optical communication system comprises a first optical interface, an optical processing system, and a second optical interface. The first optical interface receives an optical signal that is phase-modulated and has a first wavelength. The optical processing system converts the first wavelength of the optical signal to a second wavelength that is different from the first wavelength without converting the optical signal into an electrical format. The second optical interface transfers the optical signal that is phase-modulated and has the second wavelength.

18 Claims, 5 Drawing Sheets

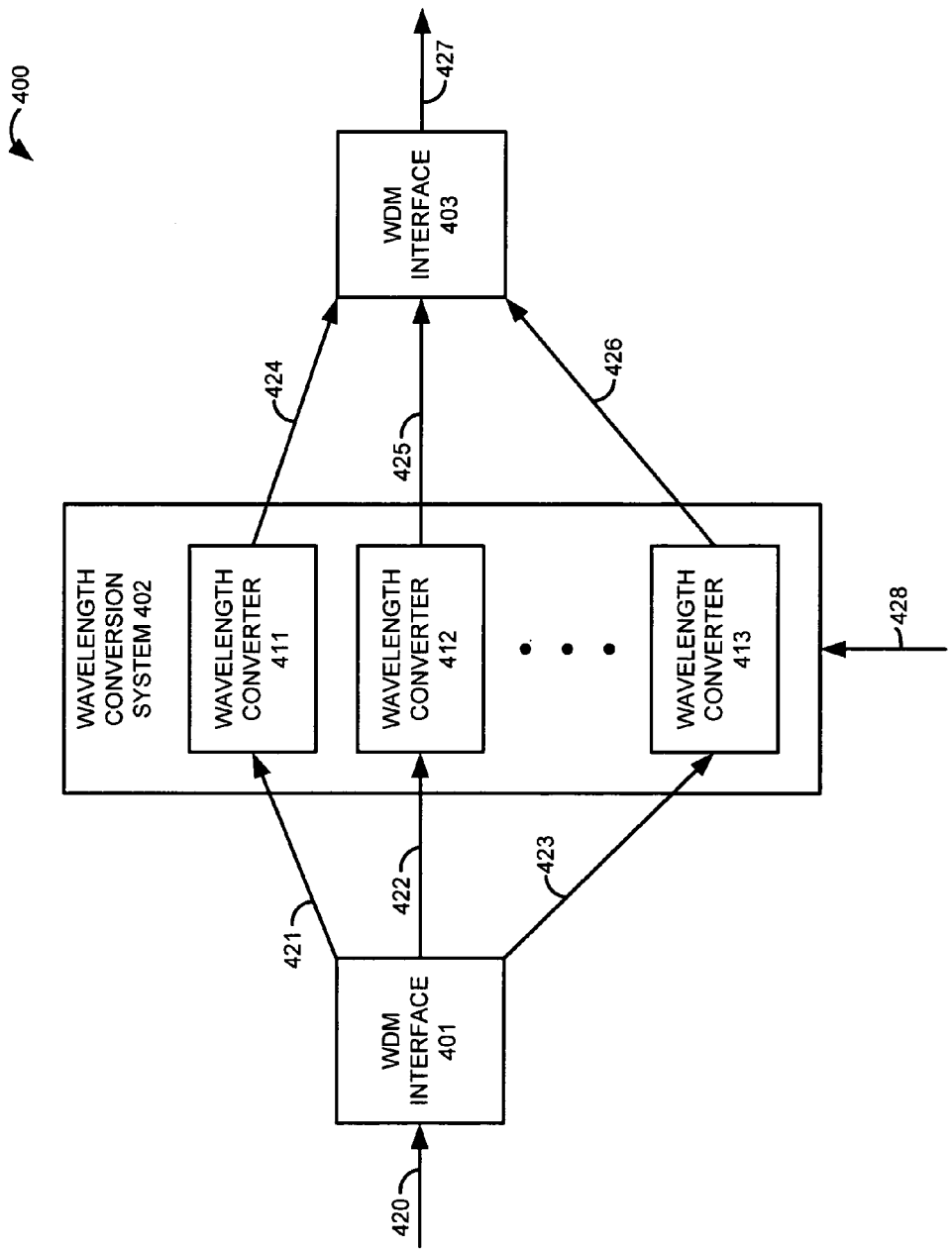

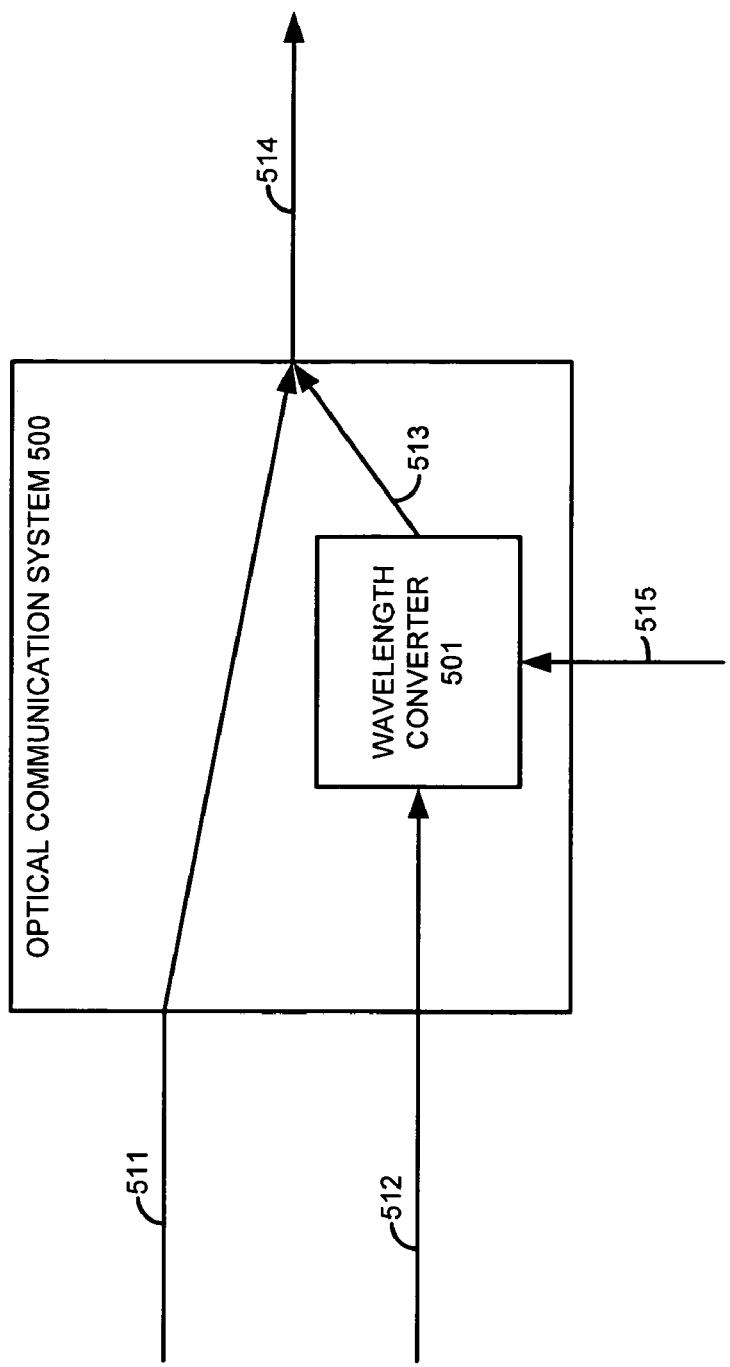

OPTICAL WAVELENGTH CONVERSION FOR PHASE-MODULATED OPTICAL SIGNALS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the conversion of optical wavelengths for optical signals.

2. Description of the Prior Art

Optical communication networks transfer optical signals over optical wavelengths. The optical signals typically employ amplitude modulation to carry user data. Sometimes, it may be desirable to convert the wavelength of an optical signal to a different wavelength. Unfortunately, the conversion of wavelengths in an optical signal has often required the inefficient conversion of the optical signal into the electrical format.

All-optical wavelength conversion refers to the fact the wavelength of the optical signal is converted without converting the optical signal itself into the electrical format. All-optical wavelength conversion for amplitude-modulated optical signals has been developed. However, optical signals will increasingly employ phase modulation to carry user data. At present, all-optical wavelength conversion for phase-modulated optical signals has not been developed to provide an effective solution. Thus, the inefficient conversion of the optical signal into the electrical format may still be required when performing wavelength conversion for a phase-modulated optical signal. A Mach-Zehnder interferometer can convert the modulation of an optical signal between phase modulation and amplitude modulation. Unfortunately, these components have not been effectively implemented to provide all-optical wavelength conversion for phase-modulated optical signals.

SUMMARY OF THE INVENTION

Examples of the invention include optical communication systems and their methods of operation. In some examples of the invention, an optical communication system comprises a first optical interface, an optical processing system, and a second optical interface. The first optical interface receives an optical signal that is phase-modulated and has a first wavelength. The optical processing system converts the first wavelength of the optical signal to a second wavelength that is different from the first wavelength without converting the optical signal into an electrical format. The second optical interface transfers the optical signal that is phase-modulated and has the second wavelength.

In some examples of the invention, the optical processing system converts the first wavelength of the optical signal to a selected one of a plurality of wavelengths responsive to an indication of a selected wavelength. The optical processing system receives information indicating that the selected wavelength is the second wavelength and responsively converts the first wavelength of the optical signal to the selected second wavelength.

In some examples of the invention, the optical processing system includes: a first modulation converter, a wavelength converter, and a second modulation converter. The first modulation converter converts the phase modulation of the optical signal into amplitude modulation. The wavelength converter converts the first wavelength of the amplitude-modulated optical signal to the second wavelength. The second modulation converter converts the amplitude modulation of the optical signal having the second wavelength into the phase modulation to provide the phase-modulated optical signal having the second wavelength. The first modulation converter and the second modulation converter may each comprise a Mach-Zehnder interferometer that has a one-bit delay. The wavelength converter may comprise a tunable laser pump.

In some examples of the invention, the optical communication system receives another optical signal that is phase-modulated and has the first wavelength. The optical communication system transfers, over the same optical fiber, the other optical signal that is phase-modulated and has the first wavelength and the optical signal that is phase-modulated and has the second wavelength.

In some examples of the invention, the optical communication system comprises a wave division multiplex interface.

BRIEF DESCRIPTION OF THE DRAWINGS

The same reference number represents the same element on all drawings.

FIG. 4 illustrates a WDM system in an example of the invention.

FIG. 5 illustrates an optical communication system in an example of the invention.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

Figure 1:
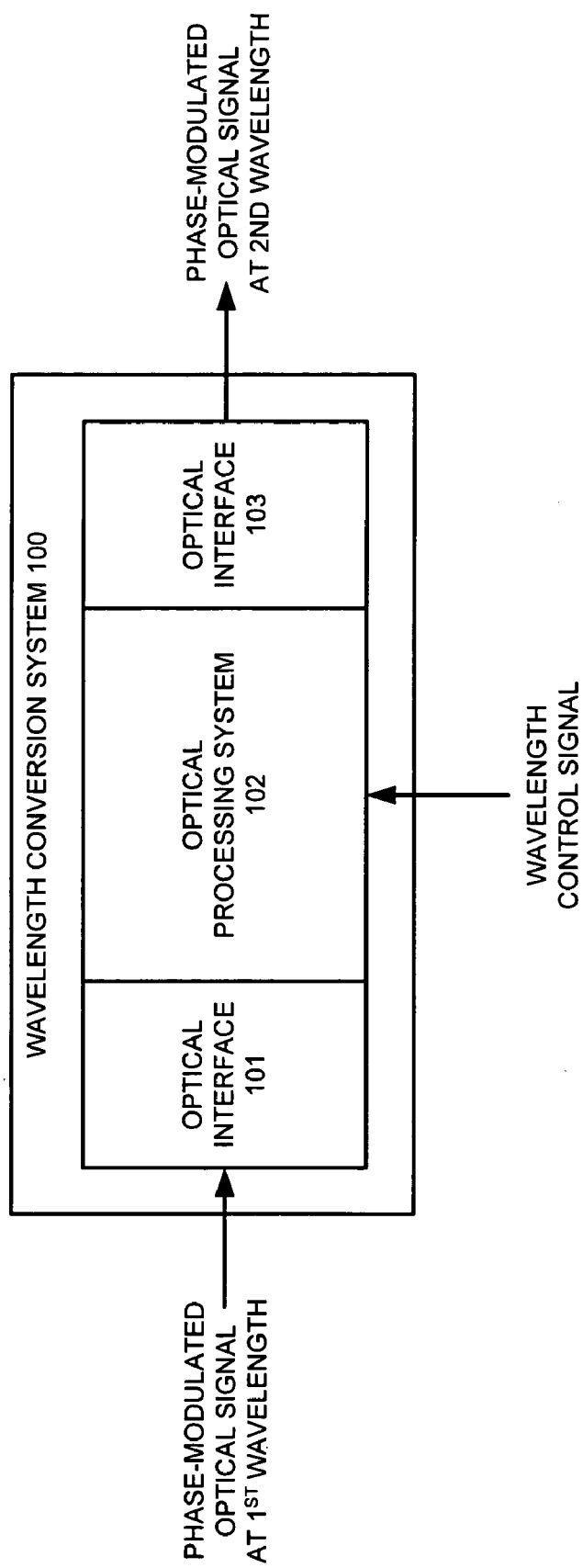
FIG. 1 illustrates a wavelength conversion system in an example of the invention.

FIG. 1 illustrates wavelength conversion system 100 in an example of the invention. Wavelength conversion system 100 includes optical interface 101, optical processing system 102, and optical interface 103. Optical interface 101 receives an optical signal. The received optical signal is phase-modulated and has a first optical wavelength. One example of a phase-modulated optical signal is a Differential Phase Shift Keyed (DPSK) optical signal.

Optical processing system 102 converts the first wavelength of the received optical signal to a second wavelength that is different from the first wavelength. Note that optical processing system 102 performs this wavelength conversion without converting the optical signal into an electrical format. Thus, the wavelength conversion performed by system 100 is all-optical. Optical interface 103 transfers the optical signal. The transferred optical signal is phase-modulated and has the second optical wavelength.

In some variations, optical processing system 102 is configured to convert the first wavelength of the optical signal to a selected one of a plurality of other wavelengths in response to a control signal that indicates the selected wavelength. In this example, the selected wavelength is the second wavelength, so optical processing system 102 receives a control signal indicating that the selected wavelength is the second wavelength. In response to the indication in the control signal, optical processing system 102 converts the first wavelength of the optical signal to the selected second wavelength.

EXAMPLE #2

Figure 2:
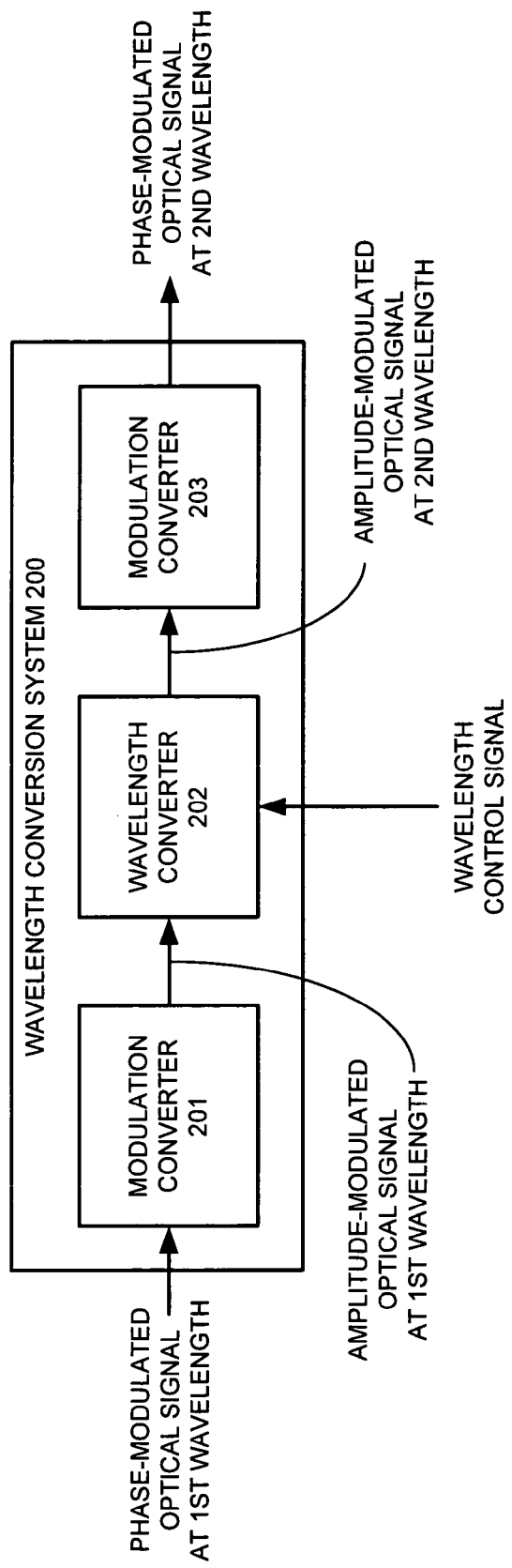
FIG. 2 illustrates a wavelength conversion system in an example of the invention.

FIG. 2 illustrates wavelength conversion system 200 in an example of the invention. Wavelength conversion system 200 includes modulation converter 201, wavelength converter 202, and modulation converter 203. Modulation converter 201 receives an optical signal. The received optical signal is phase-modulated and has a first wavelength. Modulation converter 201 converts the modulation of the optical signal from phase modulation to amplitude modulation. Modulation converter 201 transfers an amplitude-modulated version of the optical signal having the first wavelength to wavelength converter 202.

Wavelength converter 202 converts the first wavelength of the amplitude-modulated optical signal to a second wavelength. The second wavelength is different from the first wavelength. Note that wavelength converter 202 performs this wavelength conversion without converting the optical signal into an electrical format. Wavelength converter 202 transfers an amplitude-modulated version of the optical signal having the second wavelength to modulation converter 203.

Modulation converter 203 converts the modulation of the optical signal from amplitude modulation to phase modulation. Modulation converter 203 transfers a phase-modulated version of the optical signal having the second wavelength.

In some variations, wavelength converter 202 is configured to convert the first wavelength of the optical signal to a selected one of a plurality of other wavelengths in response to a control signal that indicates the selected wavelength. In this example, the selected wavelength is the second wavelength, so wavelength converter 202 receives a control signal indicating that the selected wavelength is the second wavelength. In response to the indication in the control signal, wavelength converter 202 converts the first wavelength of the optical signal to the selected second wavelength.

In some variations where DPSK is used, modulation converters 201 and 203 comprise Mach-Zehnder interferometers. In some of these variations, the Mach-Zehnder interferometers have a one-bit delay. The interferometers may be able to control the delay in response to control signal instructions. Typically, the orientation of the interferometer for modulation converter 203 is reversed, so the optical signal flows backwards through this interferometer.

In some variations, wavelength converter 202 includes a tunable laser pump and a wavelength conversion medium. The tunable laser pump generates an optical pump signal at a selected wavelength. The wavelength conversion medium could be an optical fiber, semiconductor optical amplifier, or some other suitable medium. The received optical signal and the optical pump signal interact within the wavelength conversion medium to convert the wavelength of the received optical signal. Typically, wavelength converter 202 converts the wavelength of the received optical signal to the wavelength of the optical pump signal that was generated by the tunable laser pump. In these variations, the control signal indicates the selected wavelength, and in response, the laser pump is tuned to generate the selected wavelength.

For example, if the selected wavelength is the second wavelength, then the control signal indicates the second wavelength, and responsively, the laser pump is tuned to generate an optical pump signal having the second wavelength. In response to the optical pump signal, wavelength converter 202 converts the first wavelength of the received optical signal to the second wavelength.

EXAMPLE #3

Figure 3:
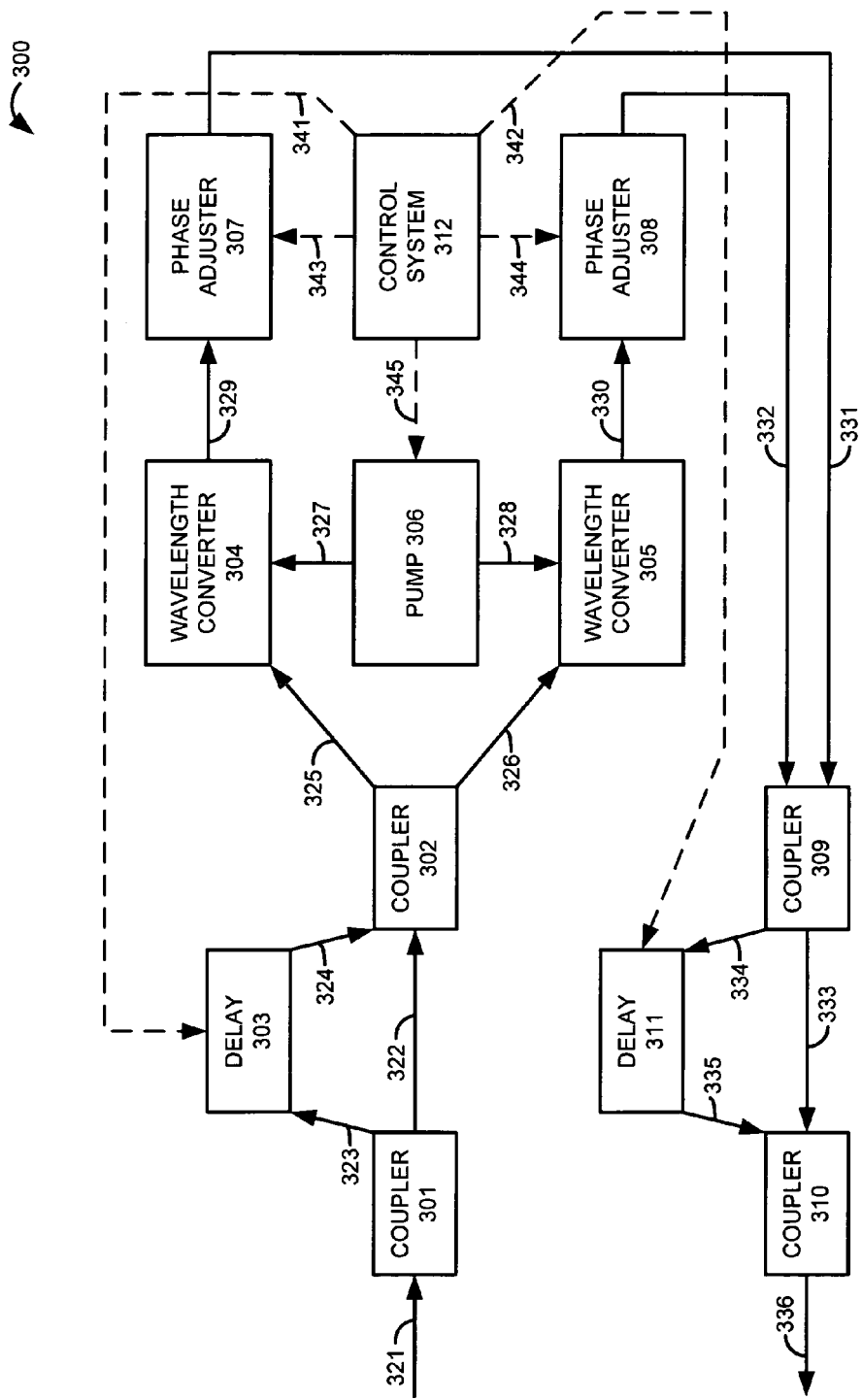
FIG. 3 illustrates a wavelength conversion system in an example of the invention.

FIG. 3 illustrates wavelength conversion system 300 in an example of the invention that uses DPSK. Wavelength conversion system 300 includes: couplers 301-302 and 309-310, delays 303 and 311, wavelength converters 304-305, pump 306, phase adjusters 307-308, and control system 312. Components 301-311 of system 300 exchange optical signals over optical wave-guides, such as optical fibers or air interfaces.

Couplers 301-302 and 309-310 could comprise directional couplers. Delay 303 and 311 are optical processing components that introduce a one-bit delay. Couplers 301-302 and delay 303 could comprise a Mach-Zehnder interferometer. Likewise, couplers 309-310 and delay 311 could comprise another Mach-Zehnder interferometer.

Wavelength converters 304-305 could be conventional components that perform wavelength conversion on amplitude-modulated optical signals. Pump 306 could comprise a tunable laser pump. Phase adjusters 307-308 could comprise conventional components that adjust the phase of an optical signal. For example, phase adjusters 307-308 could each be a length of fiber with precise temperature control that controls the length of the fiber. The phase of an optical signal leaving the fiber may be controlled by controlling the temperature, which in turn, controls the length of the fiber.

Control system 312 could be integrated with components 301-311 of system 300 or could be externally located from components 301-311. Control system 312 could be a programmed general-purpose computer or programmed special-purpose circuitry. Control system 312 typically has a user interface, such as a graphical screen and input keys. Control system 312 typically has a communication interface to exchange control signals with the other components of system 300.

The following discussion describes the operation of wavelength conversion system 300. For clarity, optical signal 321 that is originally received by system 300 is subsequently given various reference numbers as the optical signal is processed. Those skilled in the art will appreciate that these optical signals could be viewed as different versions of originally received optical signal 321. Note that these optical signals are not converted into an electrical format.

In operation, control system 312 transfers control signals 341-345 to configure system 300. Control signals 341-342 respectively control the delay introduced by delays 303 and 311. The delay should be a one-bit delay given the transmission speeds and protocols used for optical signal 323 and 334. Control signals 343-344 control the phase adjustment introduced by phase adjusters 307-308. The phase relationship of optical signals 331-332 should be adjusted to match the phase relationship of optical signals 325-326. Control signal 345 controls the wavelength of optical pump signals 327-328.

After configuration, coupler 301 receives optical signal 321. Optical signal 321 is phase-modulated and has a first wavelength. Coupler 301 splits optical signal 321 into optical signals 322 and 323. Coupler 301 transfers optical signal 322 to coupler 302 and transfers optical signal 323 to delay 303. Delay 303 introduces a one-bit delay into optical signal 323 to transfer optical signal 324 having the one-bit delay to coupler 302. Coupler 302 combines optical signals 322 and 324 on the same optical medium and then splits the combined optical signal into optical signals 325-326. Optical signal 325 is an amplitude-modulated version of phase-modulated optical signal 321. Optical signal 326 is an inverted version of optical signal 325.

Responsive to control signal 345 that indicates a selected wavelength, pump 306 transfers optical pump signals 327-328 to respective wavelength converters 304-305. In this example, the selected wavelength is the second wavelength, so optical pump signals 327-328 have the second wavelength. In response to optical pump signal 327, wavelength converter 304 converts optical signal 325 having the first wavelength into optical signal 329 having the second wavelength. Likewise, in response to optical pump signal 328, wavelength converter 305 converts optical signal 326 having the first wavelength into optical signal 330 having the second wavelength.

Wavelength converters 304-305 respectively transfer optical signals 329-330 to phase adjusters 307-308. In response to control signals 343-344, phase adjusters 307-308 adjust the phase of optical signals 329-330 to provide optical signals 331-332 that have the same phase relationship as optical signals 325-326. Note that this phase adjustment could be implemented without one of phase adjusters 307-308. For example, phase adjuster 308 could be omitted, and the proper phase relationship could be attained through the use of phase adjuster 307. Phase adjusters 307-308 respectively transfer optical signals 331-332 to coupler 309.

Note that the wavelength conversion could occur without converter 305, adjuster 308, and optical signals 326, 328, 330, 332, and 344, so these components and signals could be omitted if desired. The inclusion of these components and signals does increase the power of resulting optical signal 336.

Coupler 309 combines optical signals 331-332 onto the same optical medium, and then splits the combined optical signal into optical signals 333-334. Coupler 309 transfers optical signal 333 to coupler 310 and transfers optical signal 334 to delay 311. Delay 311 introduces a one-bit delay into optical signal 334 to transfer optical signal 335 having the one-bit delay to coupler 310. Coupler 310 combines optical signals 333 and 335 onto the same optical medium to provide optical signal 336. Optical signal 336 is a phase-modulated optical signal having the second wavelength.

Note that the originally received optical signal 321 was a phase-modulated signal having the first wavelength. The subsequently transferred optical signal 336 is a phase-modulated signal having the second wavelength. Other than the change in wavelength, optical signals 321 and 336 are phase-modulated with the same user data. The second wavelength of optical signal 336 can be selected by the user of control system 312. Thus, system 300 is capable of converting the wavelength of a phase-modulated optical signal to a user-selected wavelength. Note that optical signal 321 was converted into optical signal 336 without converting optical signal 321 from the optical format into an electrical format.

EXAMPLE #4

FIG. 4 illustrates Wave Division Multiplex (WDM) system 400 in an example of the invention. WDM system 400 includes WDM interfaces 401 and 403, and wavelength conversion system 402. Wavelength conversion system 402 includes wavelength converters 411-413. Wavelength converters 411-413 could be configured like the examples described above.

WDM interface 401 receives optical signal 420. Optical signal 420 includes multiple component optical signals having different optical wavelengths 1-N. The component optical signals are phase-modulated. WDM interface 401 de-multiplexes optical signal 420 into component optical signals 421-423. WDM interface 401 transfers optical signal 421 having wavelength #1 to wavelength converter 411. WDM interface 401 transfers optical signal 422 having wavelength #2 to wavelength converter 412. WDM interface 401 transfers optical signal 423 having wavelength #N to wavelength converter 413.

Wavelength conversion system 402 receives control signals 428 indicating various selected wavelengths for optical signals 421-423. In response, wavelength converters 411-413 convert optical signals 421-423 having wavelengths 1-N into optical signals 424-426 having the selected wavelengths indicated by the control signals. Wavelength converters 411-413 respectively transfer optical signals 424-426 having the selected optical wavelengths to WDM interface 403. Optical signals 424-426 are phase-modulated. WDM interface 403 multiplexes optical signals 424-426 into optical signal 427. Optical signal 427 includes the multiple component optical signals having the selected optical wavelengths. Thus, optical signals 420 and 427 are WDM signals that are phase-modulated to carry the same user data, but the wavelengths of optical signal 420 have been changed to the selected wavelengths of optical signal 427 responsive to control signals 428.

EXAMPLE #5

FIG. 5 illustrates optical communication system 500 in an example of the invention. Optical communication system 501 includes wavelength converter 501. Wavelength converter 501 could be like the examples described above. Optical communication system 500 receives optical signals 511-512. Optical signals 511-512 are phase-modulated with different user data, but have the same wavelength. Since optical signals cannot be distinguished by wavelength, it is necessary to change the wavelength of one of the optical signals before they can be multiplexed onto the same optical medium. The wavelength of optical signal 512 is changed in this example.

Wavelength converter 501 changes the wavelength of optical signal 512 to a new wavelength as indicated by control signal 515 to provide optical signal 513. Optical signal 513 carries the same user data as optical signal 512, but optical signal 513 uses a different wavelength than optical signals 511-512. Optical communication system multiplexes optical signals 511 and 513 into optical signal 514. Because of the wavelength conversion, optical signals 511 and 513 can be distinguished from one another by wavelength within optical signal 514.

ADVANTAGES

Advantageously, the wavelength conversion systems perform wavelength conversion without the inefficient optical-to-electrical conversion of the optical signal. In addition, the wavelength conversion systems convert the wavelengths of phase-modulated optical signals. If desired, the wavelength conversion systems convert the original wavelength to a selected wavelength that can be indicated in a control signal.

The invention claimed is:

1. An optical communication system comprising:
    a first optical interface configured to receive an optical signal that is phase-modulated and has a first wavelength;
    an optical processing system configured to convert the first wavelength of the optical signal to a second wavelength that is different from the first wavelength without converting the optical signal into an electrical format; and
    a second optical interface configured to transfer the optical signal that is phase-modulated and has the second wavelength;
    wherein the optical processing system includes:
        a first modulation converter configured to convert the phase modulation of the optical signal into amplitude modulation;
        a wavelength converter configured to convert the first wavelength of the amplitude-modulated optical signal to the second wavelength; and
        a second modulation converter configured to convert the amplitude modulation of the optical signal having the second wavelength into the phase modulation to provide the phase-modulated optical signal having the second wavelength.

2. The optical communication system of claim 1 wherein the optical processing system is configured to convert the first wavelength of the optical signal to a selected one of a plurality of wavelengths responsive to an indication of a selected wavelength, and to receive information indicating that the selected wavelength is the second wavelength and to responsively convert the first wavelength of the optical signal to the selected second wavelength.

3. The optical communication system of claim 1 wherein the first modulation converter comprises a Mach-Zehnder interferometer.

4. The optical communication system of claim 3 wherein the Mach-Zehnder interferometer has a one-bit delay.

5. The optical communication system of claim 1 wherein the second modulation converter comprises a Mach-Zehnder interferometer.

6. The optical communication system of claim 5 wherein the Mach-Zehnder interferometer has a one-bit delay.

7. The optical communication system of claim 1 wherein the wavelength converter comprises a tunable laser pump.

8. The optical communication system of claim 1 wherein the optical communication system is configured to receive another optical signal that is phase-modulated and has the first wavelength and to transfer, over the same optical fiber, the other optical signal that is phase-modulated and has the first wavelength and the optical signal that is phase-modulated and has the second wavelength.

9. The optical communication system of claim 1 further comprising a wave division multiplex interface.

10. A method of operating an optical communication system, the method comprising:
    receiving an optical signal that is phase-modulated and has a first wavelength;
    converting the first wavelength of the optical signal to a second wavelength that is different from the first wavelength without converting the optical signal into an electrical format; and
    transferring the optical signal that is phase-modulated and has the second wavelength;
    wherein converting the first wavelength of the optical signal to the second wavelength comprises:
        converting the phase modulation of the optical signal into amplitude modulation;
        converting the first wavelength of the amplitude-modulated optical signal to the second wavelength; and
        converting the amplitude modulation of the optical signal having the second wavelength into the phase modulation to provide the phase-modulated optical signal having the second wavelength.

11. The method of claim 10 wherein the optical processing system is configured to convert the first wavelength of the optical signal to a selected one of a plurality of wavelengths responsive to an indication of a selected wavelength, and further comprising receiving information indicating that the selected wavelength is the second wavelength, and wherein converting the first wavelength to the second wavelength comprises converting the first wavelength to the second wavelength responsive to the information.

12. The method of claim 10 wherein converting the phase modulation of the optical signal into the amplitude modulation comprises using a Mach-Zehnder interferometer.

13. The method of claim 12 wherein the Mach-Zehnder interferometer has a one-bit delay.

14. The method of claim 10 wherein converting the amplitude modulation of the optical signal into the phase modulation comprises using a Mach-Zehnder interferometer.

15. The method of claim 14 wherein the Mach-Zehnder interferometer has a one-bit delay.

16. The method of claim 10 wherein converting the first wavelength of the amplitude-modulated optical signal to the second wavelength comprises using a tunable laser pump.

17. The method of claim 10 further comprising receiving another optical signal that is phase-modulated and has the first wavelength, and transferring, over the same optical fiber, the other signal that is phase-modulated and has the first wavelength and the optical signal that is phase-modulated and has the second wavelength.

18. The method of claim 10 further comprising receiving the optical signal from a wave division multiplex interface.

* * * * *